(12) United States Patent
Hollman et al.

(10) Patent No.: US 12,253,158 B2
(45) Date of Patent: Mar. 18, 2025

(54) DRIVELINE FOR POWERSPORTS VEHICLE

(71) Applicant: Polaris Industries Inc., Medina, MN (US)

(72) Inventors: Keith A. Hollman, Osceola, WI (US); Michael J. Whiting, North Branch, MN (US); Daniel S. Weber, North Branch, MN (US); Evan R. Wozniak, Stacy, MN (US); Anthony J. Ripley, Ham Lake, MN (US); Jason Carl Plugge, Mahtomedi, MN (US); Na Her, Little Canada, MN (US)

(73) Assignee: Polaris Industries Inc., Medina, MN (US)

(*) Notice: Subject to any disclaimer, the term of this patent is extended or adjusted under 35 U.S.C. 154(b) by 60 days.

(21) Appl. No.: 18/101,758

(22) Filed: Jan. 26, 2023

(65) Prior Publication Data

US 2023/0167894 A1  Jun. 1, 2023

Related U.S. Application Data

(63) Continuation of application No. 17/712,343, filed on Apr. 4, 2022, now Pat. No. 11,624,435, which is a
(Continued)

(51) Int. Cl.
*F16H 57/025* (2012.01)
*B60K 17/04* (2006.01)
(Continued)

(52) U.S. Cl.
CPC ........... *F16H 57/028* (2013.01); *B60K 17/04* (2013.01); *B60K 17/165* (2013.01); *B62D 21/09* (2013.01); *F16H 57/025* (2013.01)

(58) Field of Classification Search
CPC ........ B62D 21/09; B62D 25/08; F16H 57/025
See application file for complete search history.

(56) References Cited

U.S. PATENT DOCUMENTS

| 2,025,668 A | 12/1935 | Lundelius et al. |
| 2,112,628 A | 3/1938 | Lee |

(Continued)

FOREIGN PATENT DOCUMENTS

| CN | 201810718 U | 4/2011 |
| CN | 201934497 U | 8/2011 |

(Continued)

OTHER PUBLICATIONS

International Preliminary Report on Patentability received for PCT Patent Application No. PCT/US2017/065703, mailed on Jun. 25, 2019, 16 pages.

(Continued)

*Primary Examiner* — Paul N Dickson
*Assistant Examiner* — Tiffany L Webb
(74) *Attorney, Agent, or Firm* — Faegre Drinker Biddle & Reath LLP (57) ABSTRACT

A Powersports vehicle is disclosed which includes a frame, ground engaging members supporting the frame, comprising at least two front wheel, and a power source for driving the front wheels. A front drive is coupled to the power source and to the front wheels, the front drive being coupled to the frame through isolation mounts to reduce vibration of the front drive through the frame.

16 Claims, 12 Drawing Sheets

Related U.S. Application Data continuation of application No. 16/705,864, filed on Dec. 6, 2019, now Pat. No. 11,313,452, which is a continuation of application No. 15/389,147, filed on Dec. 22, 2016, now Pat. No. 10,502,308.

(51) Int. Cl.
*B60K 17/16* (2006.01)
*B62D 21/09* (2006.01)
*F16H 57/028* (2012.01)

(56) References Cited

U.S. PATENT DOCUMENTS

| | | | |
|---|---|---|---|
| 2,660,254 A | 11/1953 | Kolbe | |
| 2,681,118 A | 6/1954 | Franz | |
| 2,968,357 A | 1/1961 | Roller | |
| 3,825,090 A * | 7/1974 | Runkle | F16F 15/08 180/300 |
| 4,097,957 A | 7/1978 | Kitutaka | |
| 4,240,517 A | 12/1980 | Harlow et al. | |
| 4,811,812 A * | 3/1989 | Cassese | B60G 99/00 180/312 |
| 4,943,092 A * | 7/1990 | Haraguchi | B60G 99/004 180/300 |
| 5,160,113 A | 11/1992 | Whiddon | |
| 5,267,623 A | 12/1993 | Kashiwagi | |
| 5,630,575 A | 5/1997 | Koyanagi et al. | |
| 5,842,687 A | 12/1998 | David | |
| 5,915,495 A | 6/1999 | Kerlin et al. | |
| 5,971,413 A | 10/1999 | El-Kassouf | |
| 6,953,272 B2 | 10/2005 | Hayakawa et al. | |
| 6,959,780 B2 | 11/2005 | Oshima et al. | |
| 7,185,723 B2 | 3/2007 | Aoyama et al. | |
| 7,296,650 B2 | 11/2007 | Ohta et al. | |
| 7,510,163 B2 | 3/2009 | Schlitzkus et al. | |
| 7,708,103 B2 * | 5/2010 | Okuyama | B60K 5/1216 180/291 |
| 7,802,816 B2 * | 9/2010 | McGuire | B60G 7/008 180/311 |
| 7,967,316 B2 | 6/2011 | Chisuwa | |
| 8,047,557 B2 * | 11/2011 | Kobayashi | B62D 25/2018 280/124.135 |
| 8,069,944 B2 | 12/2011 | Fell | |
| 8,132,640 B2 | 3/2012 | Heitkamp et al. | |
| 8,342,548 B1 * | 1/2013 | Vey | B60G 11/27 180/312 |
| 8,382,125 B2 * | 2/2013 | Sunsdahl | B62K 25/00 280/124.152 |
| 8,540,261 B2 | 9/2013 | Okamoto | |
| 8,596,405 B2 * | 12/2013 | Sunsdahl | B62D 21/183 180/312 |
| 8,602,152 B2 | 12/2013 | Kashiwai et al. | |
| 8,651,503 B2 * | 2/2014 | Rhodig | B62D 9/02 280/5.509 |
| 8,657,060 B2 | 2/2014 | Ohno et al. | |
| 8,727,063 B1 * | 5/2014 | Yamamoto | B60K 5/1216 180/312 |
| 8,776,937 B2 | 7/2014 | Kim et al. | |
| 8,776,939 B2 * | 7/2014 | Kuramoto | B60K 5/02 180/300 |
| 8,794,584 B2 | 8/2014 | Shimada et al. | |
| 8,827,028 B2 * | 9/2014 | Sunsdahl | B62D 21/183 |
| 8,899,372 B1 * | 12/2014 | Vey | B60G 11/27 180/312 |
| 8,973,693 B2 * | 3/2015 | Kinsman | B60R 21/13 296/202 |
| 8,997,908 B2 * | 4/2015 | Kinsman | B62D 21/183 296/202 |
| 9,045,031 B2 * | 6/2015 | Kouma | B60K 5/1216 |
| 9,610,979 B2 | 4/2017 | Hirano et al. | |
| 9,650,078 B2 * | 5/2017 | Kinsman | B60P 7/0807 |
| 9,994,260 B2 * | 6/2018 | Ito | B62D 21/152 |
| 10,124,659 B2 * | 11/2018 | Bessho | B60K 13/04 |
| 10,502,308 B2 | 12/2019 | Hollman et al. | |
| 11,313,452 B2 | 4/2022 | Hollman et al. | |
| 11,624,435 B2 | 4/2023 | Hollman et al. | |
| 2002/0185326 A1 | 12/2002 | Mercier | |
| 2004/0254023 A1 | 12/2004 | Manaka et al. | |
| 2005/0061573 A1 | 3/2005 | Mizuno et al. | |
| 2012/0240407 A1 | 9/2012 | Sudderth | |
| 2013/0168907 A1 | 7/2013 | Mizobe et al. | |
| 2014/0124279 A1 * | 5/2014 | Schlangen | B60K 11/04 180/311 |
| 2014/0262584 A1 * | 9/2014 | Lovold | B60K 5/12 180/246 |
| 2014/0326477 A1 | 11/2014 | Thorson et al. | |
| 2015/0060182 A1 | 3/2015 | Andersson | |
| 2015/0061275 A1 * | 3/2015 | Deckard | B62D 21/183 280/124.135 |
| 2015/0183318 A1 | 7/2015 | Bandy | |
| 2015/0283891 A1 | 10/2015 | Sykes et al. | |
| 2016/0039464 A1 | 2/2016 | Hirano et al. | |
| 2017/0074388 A1 | 3/2017 | Cittadino et al. | |
| 2017/0184192 A1 | 6/2017 | Eriksson | |
| 2020/0109775 A1 | 4/2020 | Hollman et al. | |
| 2022/0221042 A1 | 7/2022 | Hollman et al. | |

FOREIGN PATENT DOCUMENTS

| | | |
|---|---|---|
| CN | 201941570 U | 8/2011 |
| CN | 202038169 U | 11/2011 |
| CN | 102529669 A | 7/2012 |
| CN | 202357846 U | 8/2012 |
| CN | 202480858 U | 10/2012 |
| CN | 202674156 U | 1/2013 |
| CN | 202765100 U | 3/2013 |
| CN | 203391609 U | 1/2014 |
| CN | 103775486 A | 5/2014 |
| CN | 203655995 U | 6/2014 |
| CN | 203685976 U | 7/2014 |
| CN | 203697943 U | 7/2014 |
| CN | 104002651 A | 8/2014 |
| CN | 203996428 U | 12/2014 |
| CN | 204137110 U | 2/2015 |
| CN | 204161111 U | 2/2015 |
| CN | 204623109 U | 9/2015 |
| CN | 204692449 U | 10/2015 |
| CN | 204956640 U | 1/2016 |
| CN | 205097909 U | 3/2016 |
| CN | 205207509 U | 5/2016 |
| DE | 0875442 | 5/1953 |
| DE | 19623936 C1 | 9/1997 |
| DE | 102014004164 A1 | 9/2015 |
| EP | 0525435 A1 | 2/1993 |
| EP | 1586789 A1 | 10/2005 |
| EP | 2876332 A1 | 5/2015 |
| EP | 2946995 A1 | 11/2015 |
| JP | 07-228163 A | 8/1995 |
| JP | 2000-313238 A | 11/2000 |
| JP | 2006-027466 A | 2/2006 |
| JP | 3767396 B2 | 4/2006 |
| JP | 4094351 B2 | 6/2008 |
| JP | 4754337 B2 | 8/2011 |
| JP | 5015692 B2 | 8/2012 |
| JP | 5033871 B2 | 9/2012 |
| JP | 5814781 B2 | 11/2015 |
| JP | 2016-043723 A | 4/2016 |
| WO | 99/61272 A1 | 12/1999 |
| WO | 2008/123059 A1 | 10/2008 |
| WO | 2016/047341 A1 | 3/2016 |

OTHER PUBLICATIONS

International Search Report and Written Opinion of the International Searching Authority, dated Mar. 14, 2018, for related International patent application No. PCT/US2017/065703; 8 pages.

* cited by examiner

DRIVELINE FOR POWERSPORTS VEHICLE

CROSS-REFERENCE TO RELATED APPLICATIONS

This application is a continuation of U.S. patent application Ser. No. 17/712,343 filed Apr. 4, 2022, titled DRIVELINE FOR POWERSPORTS VEHICLE, which is a continuation of U.S. patent application Ser. No. 16/705,864 filed Dec. 6, 2019, now U.S. Pat. No. 11,313,452, issued Apr. 26, 2022, titled DRIVELINE FOR POWERSPORTS VEHICLE, which is a continuation of U.S. patent application Ser. No. 15/389,147, filed Dec. 22, 2016, now U.S. Pat. No. 10,502,308, issued Dec. 10, 2019, titled DRIVELINE FOR POWERSPORTS VEHICLE, the entire disclosures of which are expressly incorporated by reference herein.

FIELD

The present invention relates generally to a driveline for a vehicle and in particular to a front and/or rear drive for a Powersports vehicle and a method of mounting to a vehicle.

BACKGROUND AND SUMMARY

Front and rear drives are known. Front drives are utilized in front wheel drive vehicles or in all wheel drive vehicles and rear drives are utilized in rear wheel drives and all wheel drive vehicles to input power from a power source such as an internal combustion engine and distribute the power to front and rear ground engaging members. Front and rear drives include a housing surrounding a plurality of gears including a ring gear and a pinion gear. The front and rear drives may be a differential but need not be.

Examples of front and rear drives for applications in vehicles may be seen in any of the following disclosures, namely: U.S. Pat. Nos. 8,827,028; 8,827,019; and US Publication 20150061275, the subject matter of which is incorporated herein by reference. A vehicle for use with the present front drive is more fully described in our application (Ser. No. 15/388,436) filed on Dec. 22, 2016.

In an exemplary embodiment of the invention, a vehicle comprises a frame; ground engaging members supporting the frame, comprising at least two wheels; a power source; a drive coupled to the power source and to the wheels, the drive being coupled to the frame through isolation mounts to reduce vibration of the drive through the frame. A lateral outermost edge of the isolation mount is outside a lateral outermost edge of the drive output on at least one side of the drive.

In another exemplary embodiment of the invention, a vehicle comprises a frame comprised of two lower frame tubes and upper frame tubes; ground engaging members supporting the frame, comprising at least two wheels; a power source; a drive coupled to the power source and to the wheels, the drive being suspended by an upper portion of the drive and a portion of the drive extends between the lower frame tubes and a portion extends above a top of the lower frame tubes.

DETAILED DESCRIPTION OF THE DRAWINGS

Figure 1:
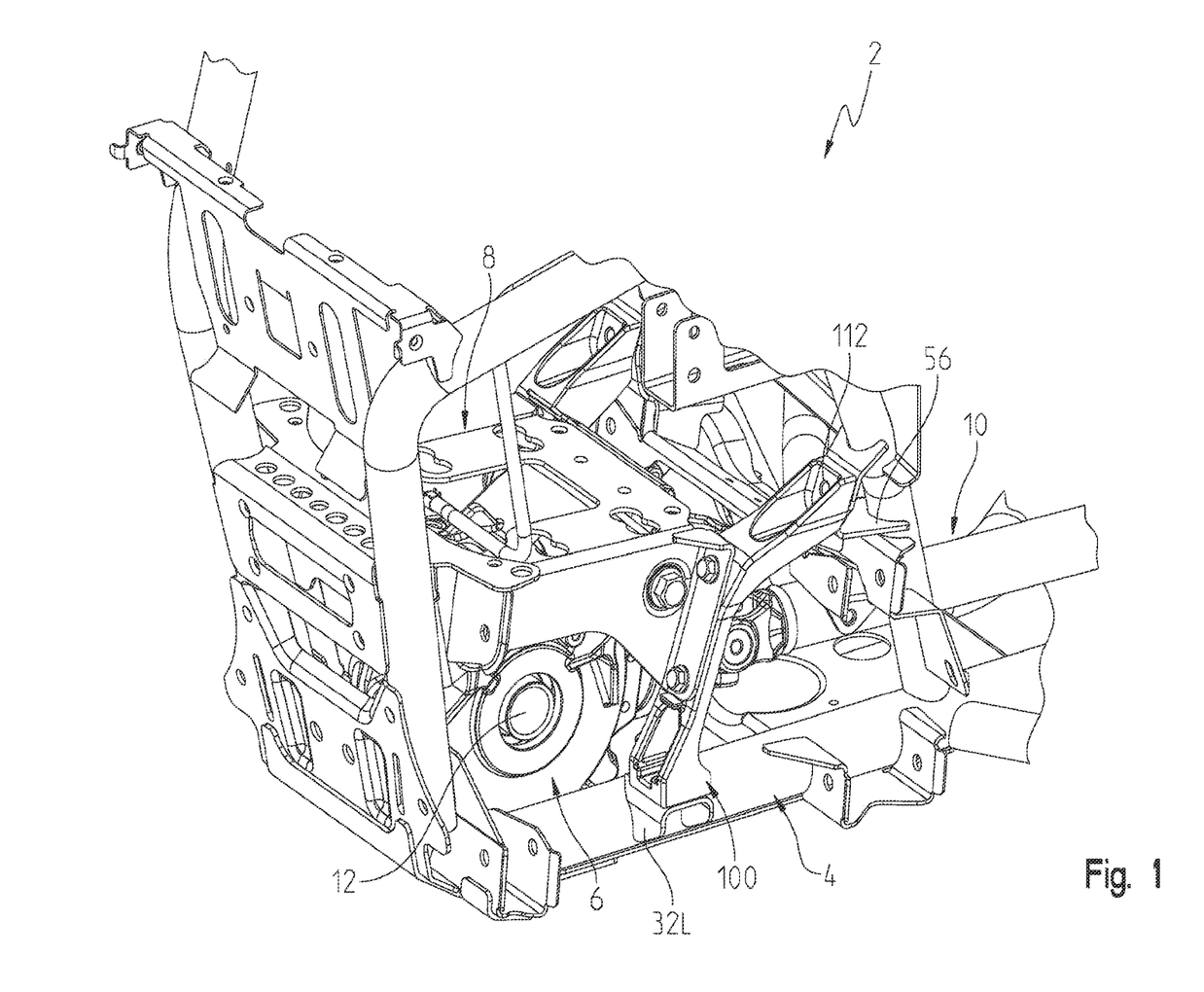
FIG. 1 is a front left perspective view of a portion of the vehicle frame showing the front drive mounted in the frame.
Figure 2:
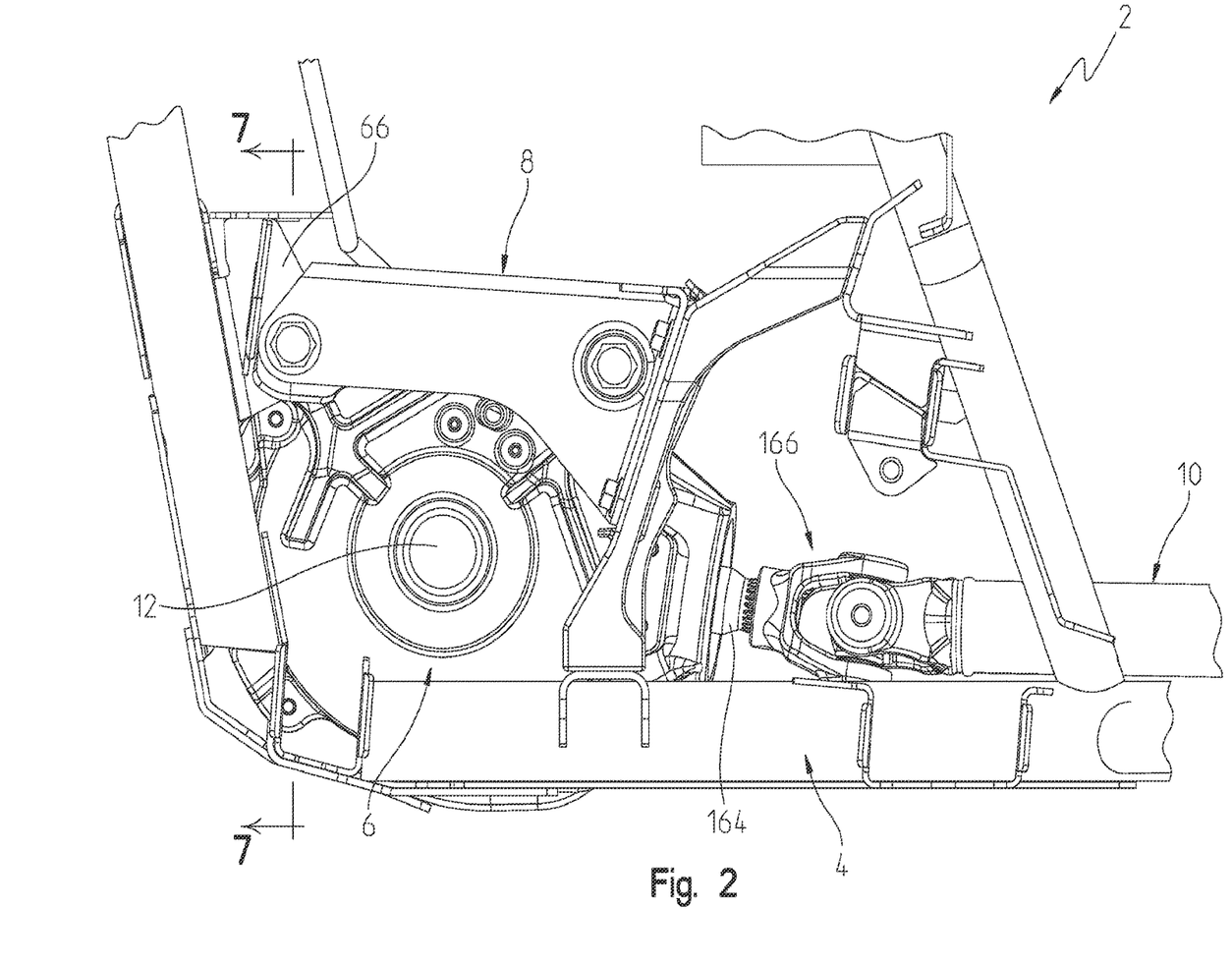
FIG. 2 is a left side view of the frame and front drive of FIG. 1.

With reference first to FIGS. 1 and 2, a vehicle front end is shown at 2 having a frame front end 4, a front drive 6 coupled to the frame 4 by way of a front drive mount 8. A prop shaft 10 extends forwardly from a powertrain (not shown) to supply power to the front drive 6 in order to drive wheels through outputs at 12. Half-shafts (not shown) would be coupled to the outputs 12 and then to the wheels, as is known. Front drive 6, may be a differential but need not be. While the embodiment shown is in the context of a front drive, the present disclosure is equally applicable to a rear drive for a vehicle.

Figure 3A:
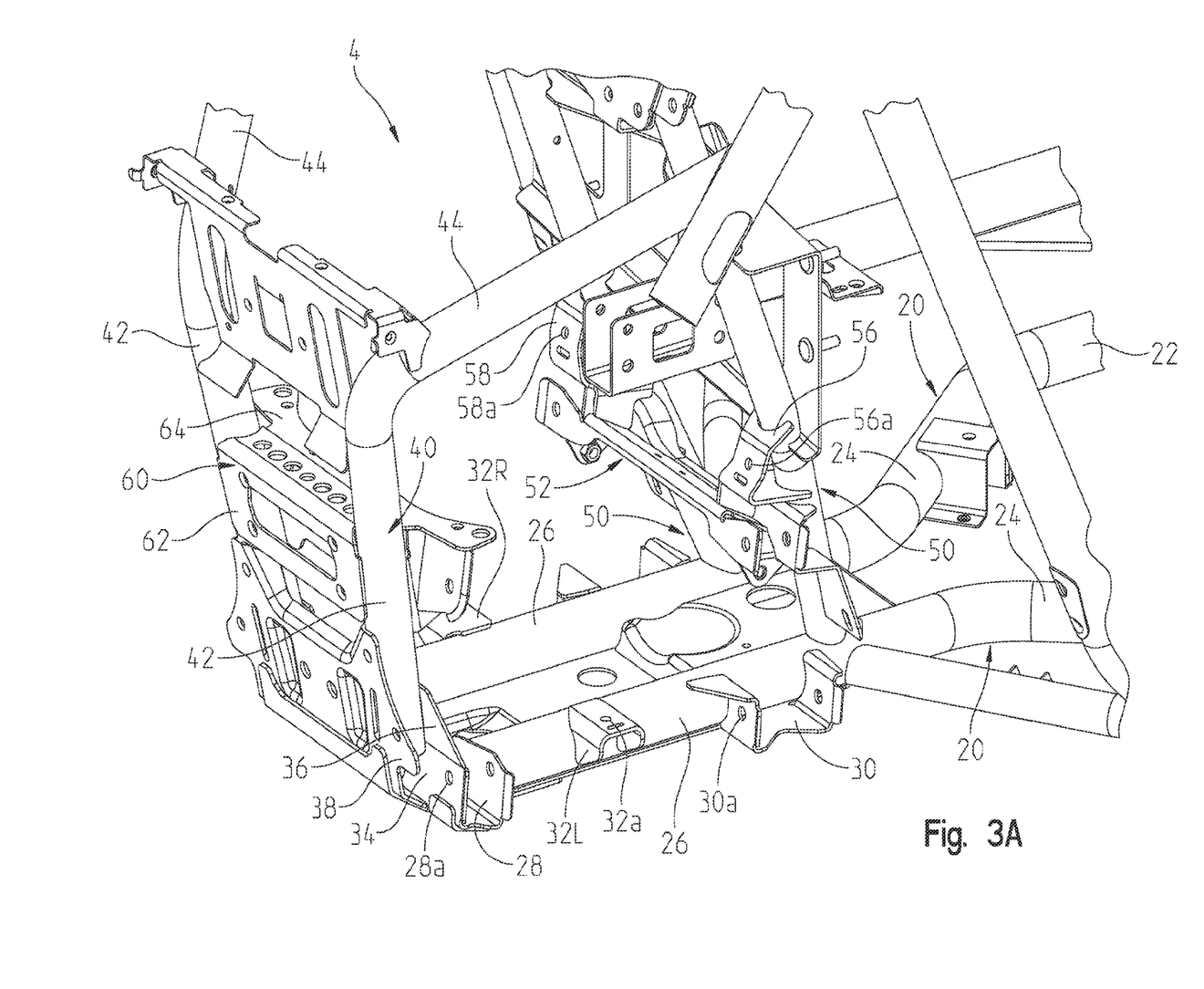
FIG. 3A is an enlarged left front perspective view of a portion of the frame shown in FIG. 1.
Figure 3B:
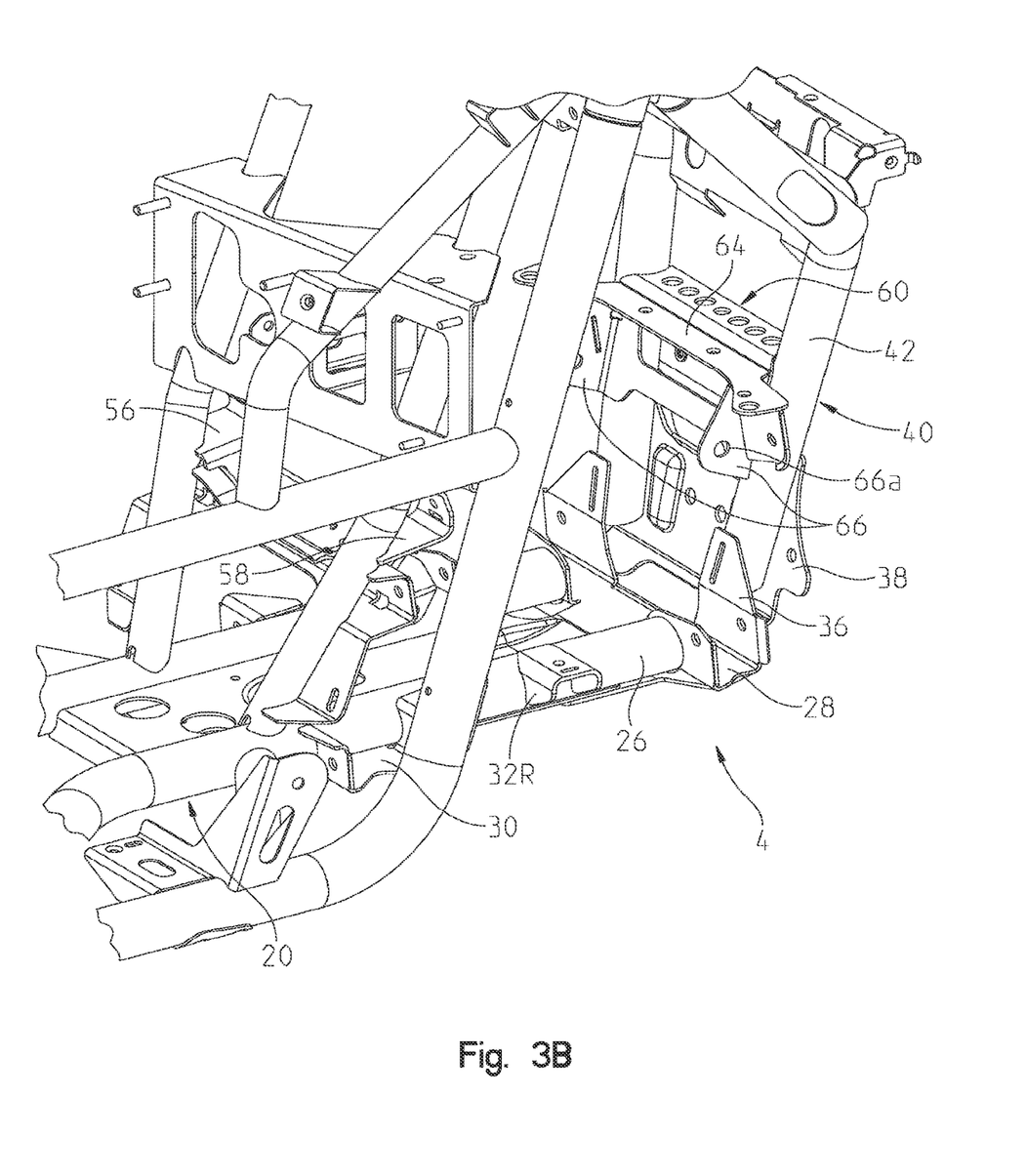
FIG. 3B is an enlarged right rear perspective view of a portion of the frame shown in FIG. 1.

With reference now to FIGS. 3A and 3B, frame front end 4 will be described in greater detail. As shown, front end 4 includes main frame tubes 20 having longitudinally extending sections at 22 which neck down at 24 defining front lower frame tubes 26. A first channel 28 extends transversely of tubes 26 and includes apertures at 28a, while a second channel 30 extends transversely of tubes 26 and includes apertures 30a. It should be appreciated that channels 28 and 30 receive a lower A-arm of the suspension system having an inner end coupled to apertures 28a and 30a. Mounting brackets 32 (32L and 32R) extend from tubes 26 intermediate channels 28 and 30 and include mounting apertures 32a. Another channel 34 is defined between plates 36 and 38 and couple frame tubes 40 thereto.

Frame tubes 40 include upright portions 42 and rearwardly extending portions 44. Rear upright tubes 50 extend upwardly from frame tubes 26 and include a further transverse channel at 52 providing another mount for an alignment arm at opposite ends thereof. Frame tubes 50 include a first mounting bracket at 56 having a mounting aperture at 56a, and a second mounting bracket 58 having a mounting aperture at 58a. A front mounting bracket 60 is coupled between the upright frame tubes 42 and defines a front mounting plate 62 for a winch, rear mounting plate 64 for a radiator and mounting brackets 66 (FIG. 3B) for the front drive mount 8 as described herein. Brackets 66 include mounting apertures at 66a.

Figure 4:
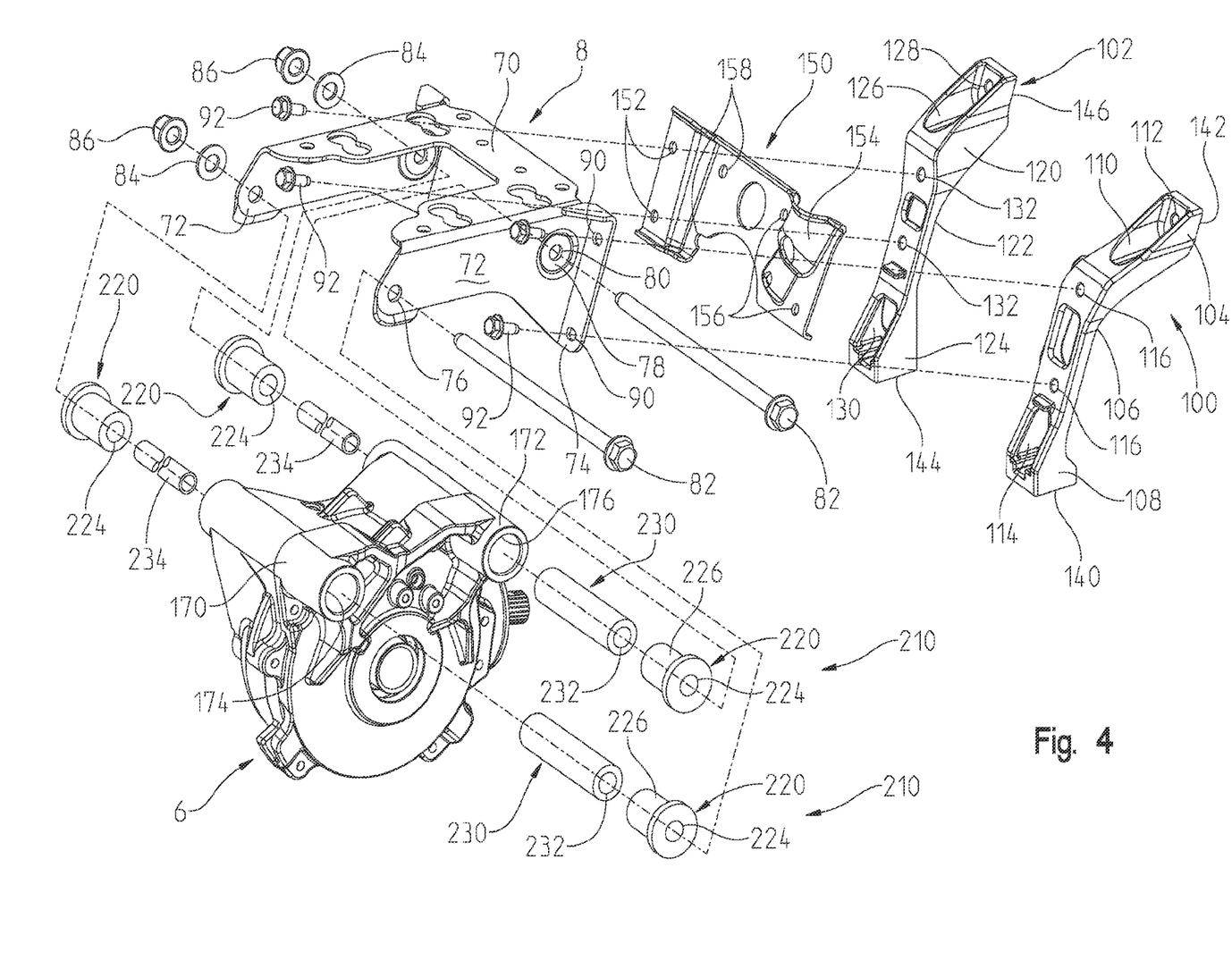
FIG. 4 is an exploded view of the front drive and mounting hardware.

With reference now to FIG. 4, front drive mount 8 is shown having a top wall at 70, side walls at 72 and rear bracket walls at 74. Side walls 72 include mounting apertures 76 and embossed mounting areas 78 having apertures 80 therethrough. As shown, fasteners 82 are receivable through openings 76 and 80 to receive washers 84 and fasteners 86 as described herein. Rear bracket wall 74 further includes mounting apertures at 90 for receiving fasteners 92 as described herein.

Figure 8:
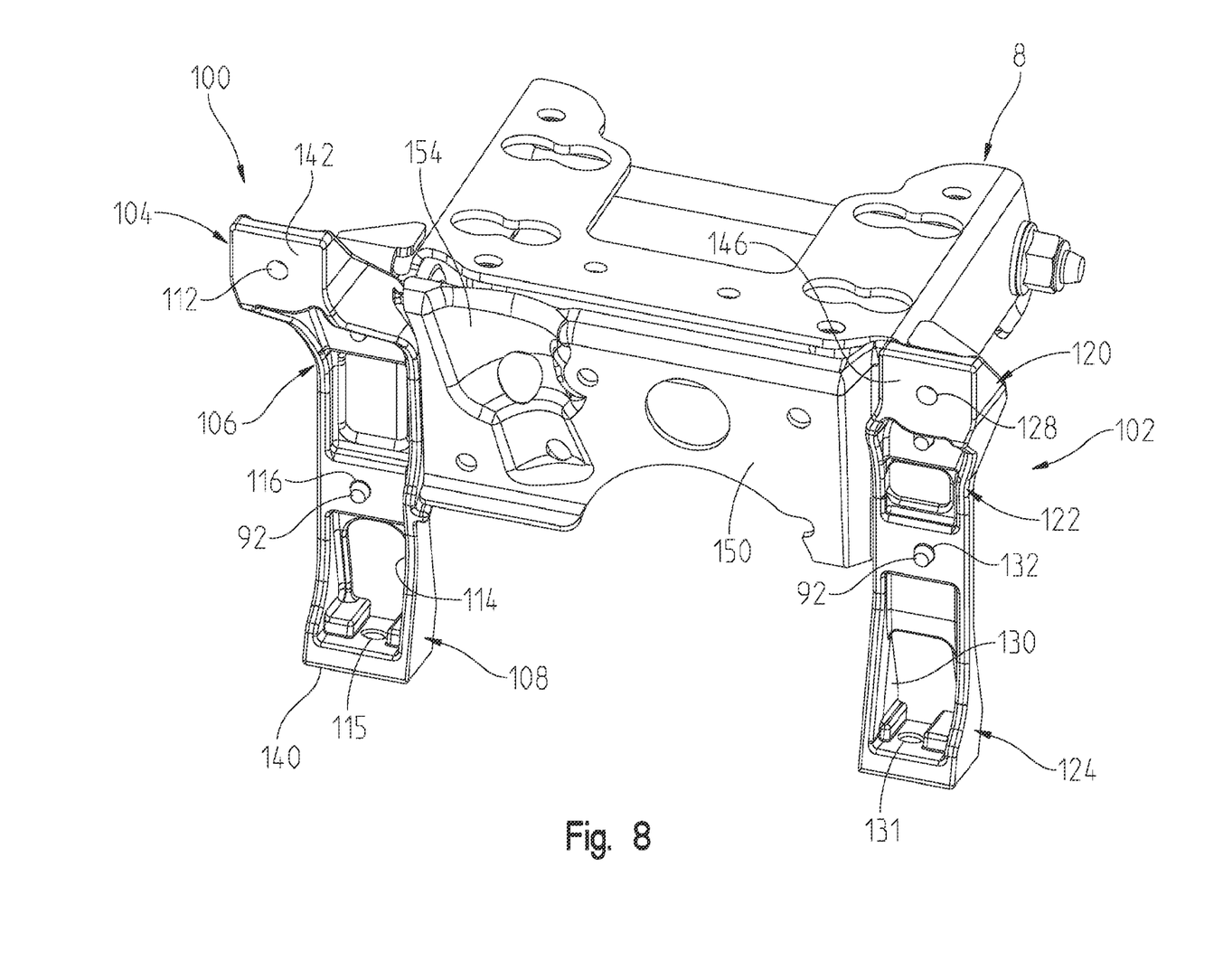
FIG. 8 shows a rear view of the mounting hardware.
Figure 9:
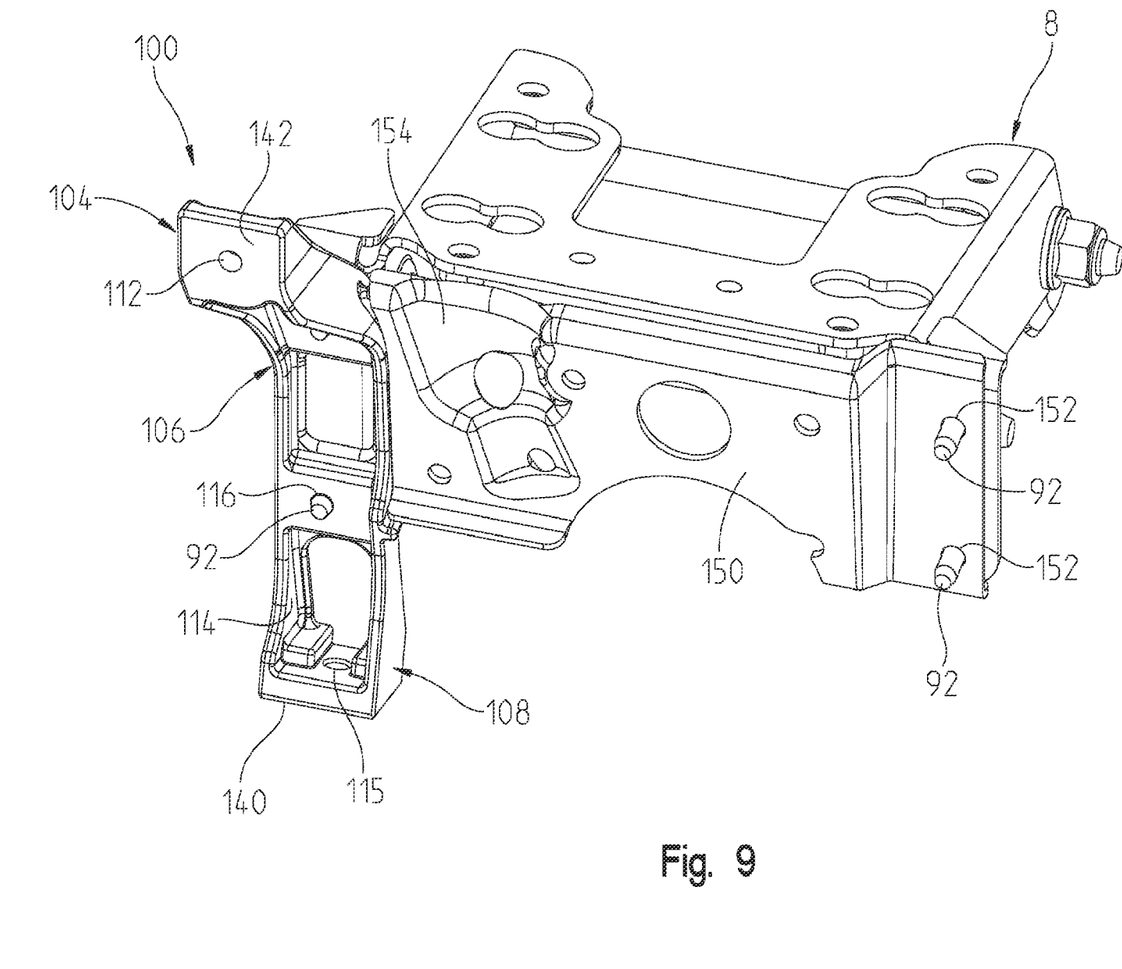
FIG. 9 is a view similar to that of FIG. 8 showing the right cast leg removed.

With reference still to FIG. 4, mounting posts 100, 102 are shown where mounting post 100 includes an upper post portion 104, an intermediate and arcuately shaped portion 106 and a lower post portion 108. Upper post portion 104 is notched at 110 and includes an aperture at 112 and lower post portion 108 is notched at 114 and includes a mounting aperture 115 (FIG. 8). Mounting apertures 116 are provided through the mounting post 100. Mounting post 102 includes an upper post portion 120, an intermediate and arcuate shaped portion 122 and a lower post portion 124. Upper post portion 120 is notched at 126 and includes a mounting aperture at 128. Lower post portion 124 is notched at 130 and includes a mounting aperture 131 (FIG. 8). Mounting apertures 132 are positioned through post 102. Post 100 includes a lower mounting surface at 140 and an upper mounting surface at 142. Post 102 includes a lower mounting surface 144 and an upper mounting surface at 146.

Figure 5:
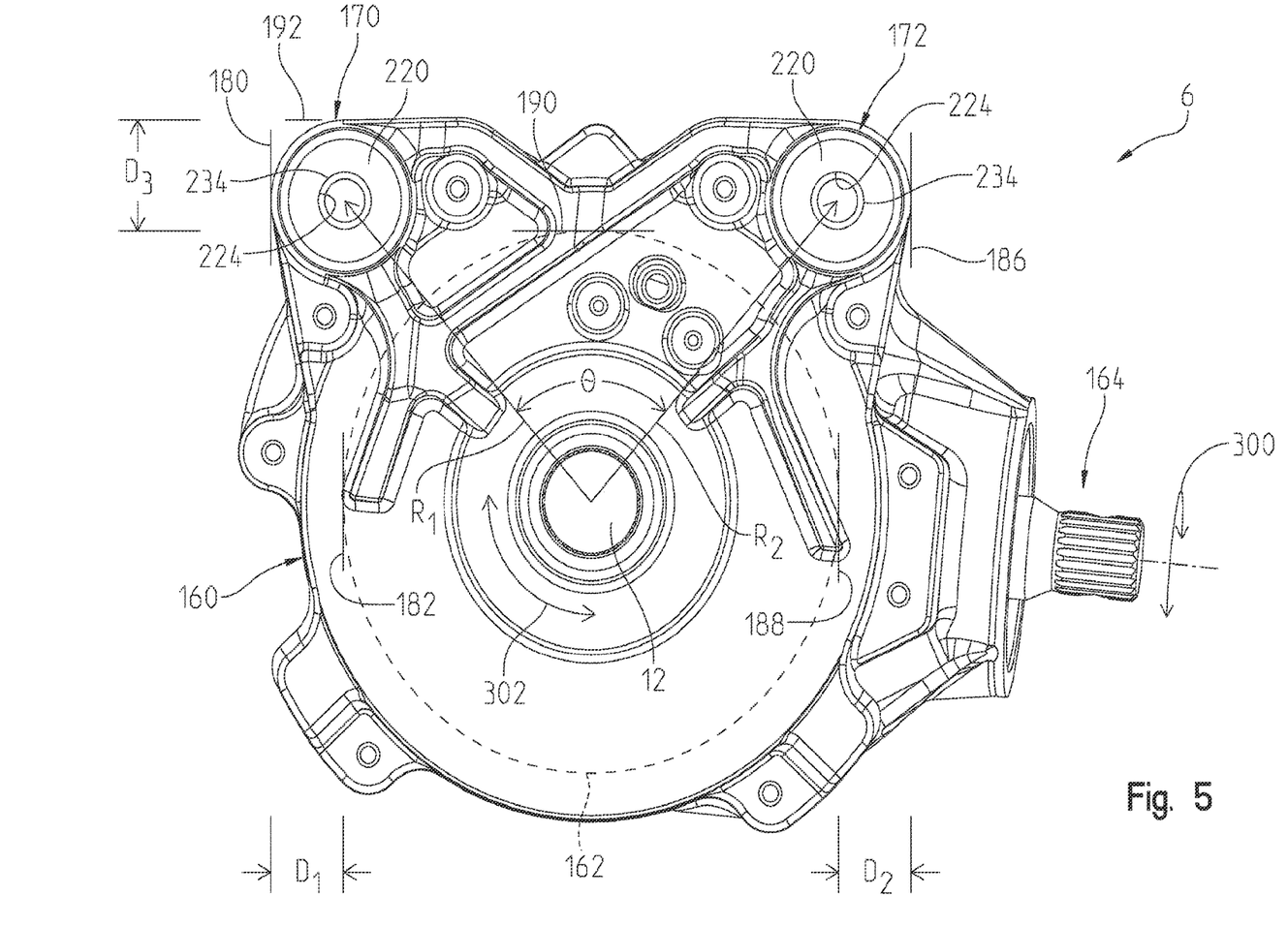
FIG. 5 is a left side view of the front drive.
Figure 6:
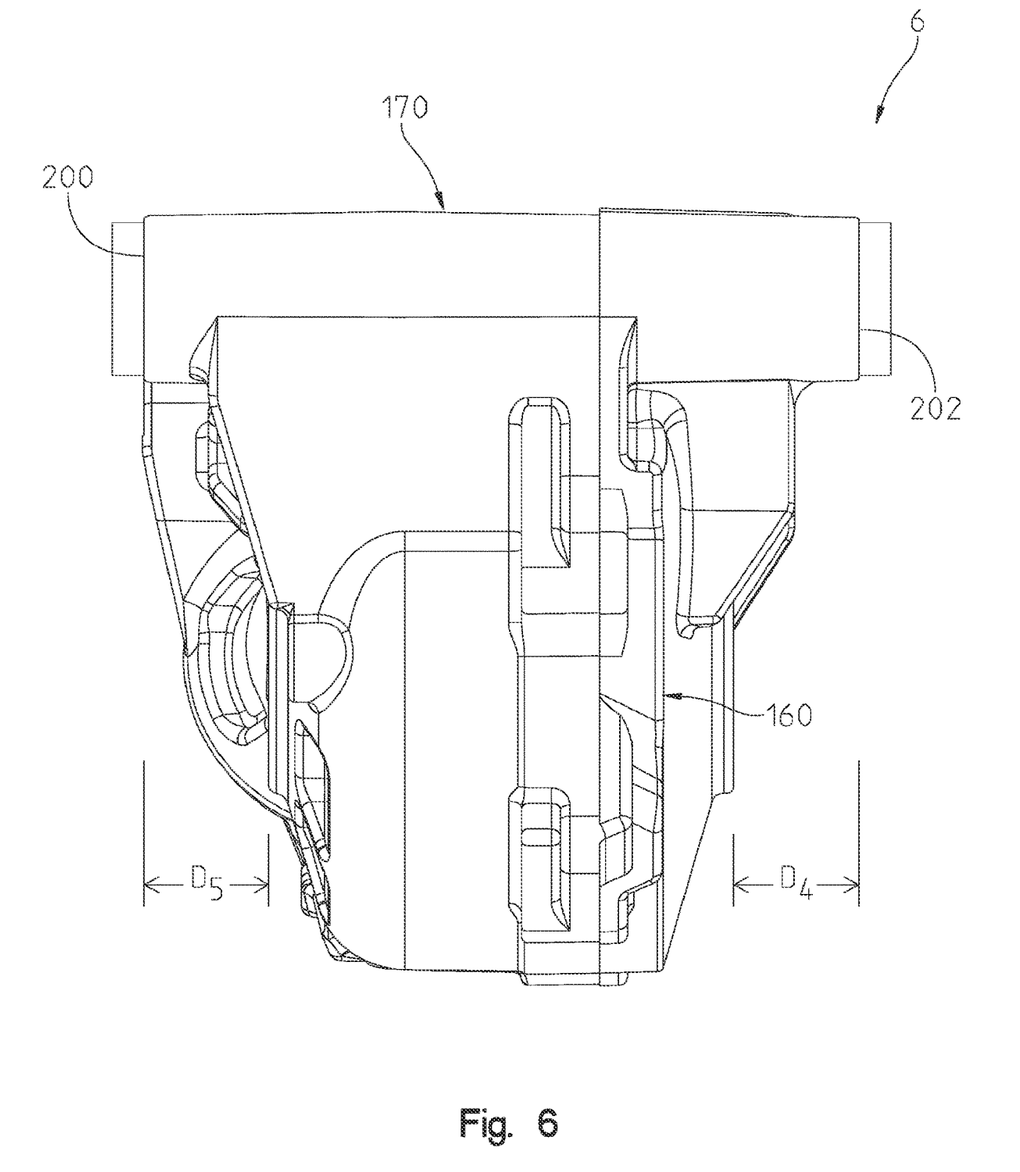
FIG. 6 is a front view of the front drive.

Although not part of the front drive mount, mounting plate 150 is coupled between the mount 8 and the posts 100, 102 and provides a mounting structure for a power steering gear as described herein. Mounting plate 150 includes mounting apertures at 152, and indentation at 154 for receiving a portion of the power steering unit, mounting apertures 156 and mounting apertures 158. With reference now to FIGS. 4-6, front drive 6 will be described in greater detail. It should be understood that the front drive mount of the present disclosure is also useable without power steering.

With reference first to FIG. 5, front drive 6 includes a housing 160 which houses a ring gear 162 shown in phantom which is driven by an input shaft 164 which couples to the prop shaft 10 through a universal joint 166 (FIG. 2). Front drive 6 further includes a front collar 170 adjacent a front end of the housing and a rear collar 172 adjacent a rear housing 160. As shown, both collars 170 and 172 are positioned towards an upper edge of housing 160 so as to suspend front drive 6 when mounted. Collar 170 has an inside diameter 174 (FIG. 4) and collar 172 has an inside diameter 176 (FIG. 4). Collars 170 and 172 are also positioned towards extreme front and rear positions of the housing as shown.

Namely, a forwardmost edge of the collar is shown at 180 which is forward of a forwardmost edge 182 of ring gear 162. Forward edge 180 is positioned forward of forwardmost edge 182 of ring gear 162 by a dimension of D1 as shown in FIG. 5. In a like manner, collar 172 has a rearwardmost position at 186 which is rearward of a rearwardmost edge of ring gear 162 as shown at 188. Rearwardmost position 186 of collar 172 is positioned rearward of ring gear 162 by a dimension of D2 as shown in FIG. 5. As also shown in FIG. 5, a top of the ring gear 162 has an extreme upper position shown at 190 whereas a top of the collar 170 is shown at 192 where the top 192 is spaced from a top 190 of the ring gear 162 by a distance of D3. Preferably, a line drawn between centers of the collars 170, 172 does not intersect a center of the output 12.

As shown in FIG. 5, the distance from a center of output 12 to a center of collar 170 is shown at $R_1$. As also shown in FIG. 5, the distance from a center of output 12 to a center of collar 172 is shown at $R_2$. In the embodiment shown, $R_1$ and $R_2$=117.8 mm. The radius of the ring gear 162 is 85.3 mm such that the ratio $R_1$/Ring Gear Radius is 1.38. Also the arc defined between the radius lines for $R_1$ and $R_2$ is shown at θ, where θ=83.6°. The acceptable range for θ is between 70° and 170°, preferably between 75° and 120°; and more preferably between 80° and 100°. It is also more preferable to have the collars 170, 172 positioned at the top of the housing, such that the packaging the drive itself may limit the angle; that is, as the angle increases so does the length of the housing 160. While the collars 170, 172 are shown at the top of the housing, it should be understood that the collars 170, 172 could be positioned in a like position at the bottom of housing 160.

With reference now to FIG. 6, the extreme lateral positions of the collar 170 are shown at 200 and 202 and extend the beyond the lateral width of the housing 160. As shown in FIG. 6, extreme lateral position 202 is spaced from an outer edge of output 12 by a distance of $D_4$, where $D_4$=30.58 mm. As also shown in FIG. 6, extreme lateral position 200 is spaced from an outer edge of left output 12 by a distance of $D_5$, where $D_5$=30.58 mm.

Figure 7:
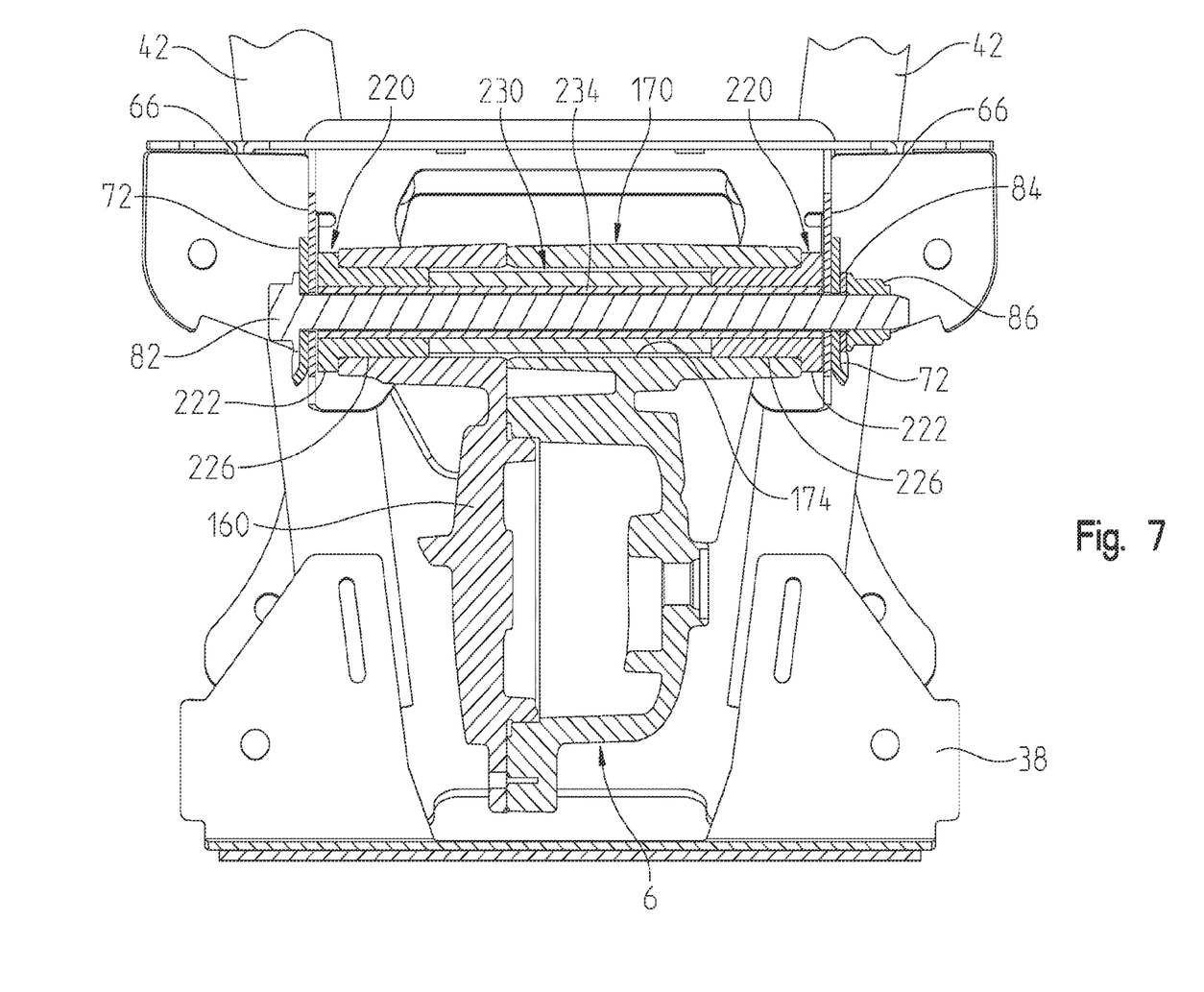
FIG. 7 is a cross-sectional view through lines 7-7 of FIG. 2.

With reference again to FIG. 4, isolation mounts 210 are positioned in each of the collars 170, 172. As shown, each isolation mount 210 is comprised of two isolation grommets 220, a single sleeve 230 and a tube 234. Grommets 220 are provided positioned in opposite ends of each of the collars 170 and 172. As shown in FIGS. 4 and 7, each of the isolation grommets 220 includes a head portion 222 having an aperture 224 extending through the entirety of the isolation grommet 220. The isolation grommets 220 also include a body portion 226 which press against inside diameters 174, 176 of the collars 170, 172 (see FIG. 7). With reference to FIGS. 4 and 7, the sleeve 230 is also provided having an aperture at 232. As shown in FIG. 7, the isolation mounts 220 are profiled such that the head portions 222 abut the ends of the collars 170, 172 whereas ends of the isolation grommets 220 abut the sleeve 230 in the collar.

The tube 234 is profiled to fit within the inner diameter 224 of grommets 220 and within the inner diameter 232 of sleeve 230. The tube 234 has a length such that it fits within surfaces 66 as shown best in FIG. 7. At the rear connection (through collar 172, the tube 234 would extend between the embossments 78). Tube 234 is constructed from a rigid material such as a metal such as aluminum or steel, such that the fasteners 82, 86 do not crush the grommets 220 when torqued. It should be appreciated that the isolation mounts 210 could be provided in any configuration, for example as a plurality of components or as integrated components.

To mount the front drive 6 to the front frame portion 4, posts 100, 102 are first mounted to the front frame portion 4. As shown in FIG. 1, post 100 is shown positioned between bracket 32L and bracket 56 with aperture 112 (FIG. 4) aligned with aperture 56a (FIG. 3A) and with aperture 115 (FIG. 8) aligned with aperture 32a (FIG. 3A). Fasteners would couple the post 100 to the front frame portion 4. In a like manner, post 102 would be positioned on bracket 32R (FIG. 3B) and bracket 58 (FIG. 3A) with aperture 128 aligned with aperture 58a (FIG. 3A) and with aperture 131 aligned with aperture 32a. Again fasteners would couple post 102 to the front frame portion 4. Mount 8 and plate 150 (FIG. 4) are then aligned such that apertures 90 on the right hand side of mount 8 are aligned with apertures 152 and with apertures 132 of post 102.

Fasteners 92 are then positioned through apertures 90 and 152 and are threadably engaged in apertures 132 of post 102. This positions the mount 8 and the post 150 in the position of FIG. 8 whereby plate 150 is suspended between posts 100 and 102. Front drive 6 may then be mounted in the mount 8 by positioning a tube 234 within each sleeve, and positioning the sleeve into each collar 170, 170. The isolation mounts 220 are then positioned in each end of the collars 170 and 172. The tubes 234 are then aligned with the apertures 76 and 80 in the mount 8. Studs such as 82 may then be positioned through apertures 76 and 80, through the sleeve 230 and then through each of the isolation mounts 220. Fasteners 84 and 86 may be connected to the studs 82. The coupled positioned of the front drive 6 to the mount 8 is shown in cross-section in FIG. 7.

Figure 10:
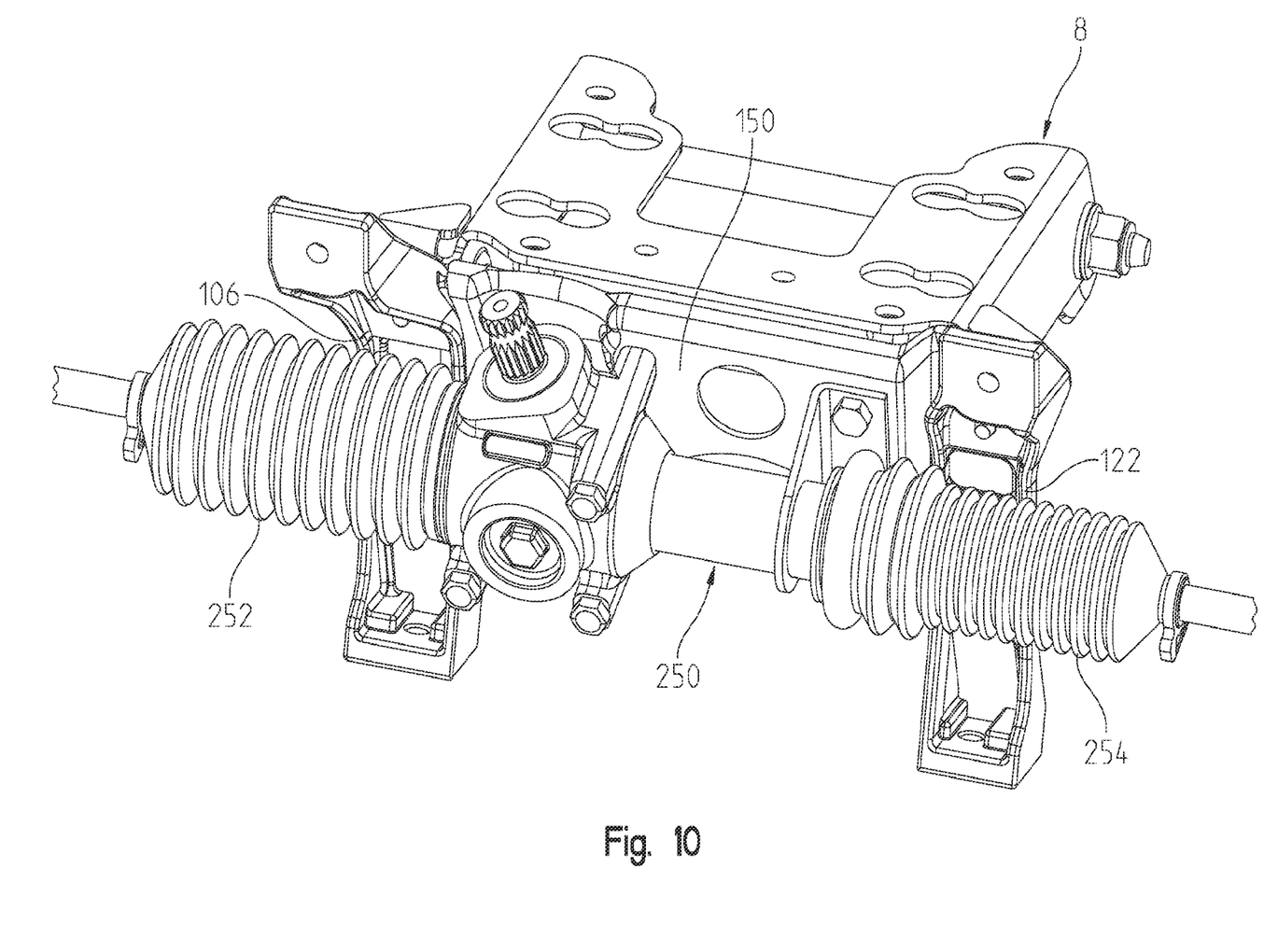
FIG. 10 is a view similar to that of FIG. 8 showing the power steering rack in a mounted condition.

With reference now to FIG. 10, the steering gear 250 may now be coupled to the backside of plate 150 whereby the boots 252 and 254 of the steering gear 250 nest within the arcuate shaped portions 106, 122 respectively.

By positioning the collars at extreme locations relative to the front drive 6, the reaction forces based upon the torque transmitted through the housing are minimized at the mounting locations. By positioning the isolation mounts within the collars, the vibration associated with the front drive 6 is reduced to the frame and resultantly to the driver through vibration. More particularly, torque along two axes is applied to the front drive 6 which causes reaction forces. Namely, a first torque is applied to the front drive as shown at 300 (FIG. 5) through the shaft 164, and a second torque is shown at 302 through couplings 12.

Also, as shown in FIG. 7, the diameter of the body portion 226 of the isolation grommets 220 is greater than the diameter of the sleeve 230. The diameter of the body portion 226 of the isolation grommets 220 is also slightly greater than the inside diameters 174, 176 of the collars 170, 172. Thus, the body portions 226 are pre-stressed upon insertion into the collars 170, 172. Also, when a reaction load is exerted on the isolation mounts 210 (from the collars 170, 172) the body portions 226 of the isolation grommets 220 will compress. If compression continues, the collar will contact the sleeve 230, which adds further resilience to the movement of the front drive 6. The sleeve 230 may have a higher durometer reading than that of the isolation grommets 220, such that the sleeve 230 is stiffer than the isolation grommets 220. This provides a dual rate spring effect to the collars 170, 172.

For example, the sleeve 230 may have a hardness (durometer reading) in the medium soft to medium hard range, whereas the isolation grommets 220 may be in the range of soft to medium soft. Also, the material composition may be consistent throughout the isolation mounts or it may be different. Moreover, the isolation mounts may be an integrated component or be in plural components. It is anticipated that the isolation mounts are comprised of a rubber-like substance.

Because the front drive 6 is suspended by the top of the front drive 6, the front drive 6 can be suspended over the lower frame tubes 26, with a portion of the front drive 6 being positioned between and lower than the lower frame tubes 26. By minimizing the spread distance between the front frame tubes 26, a length of the lower A-arms can be maximized while keeping the same track width. Furthermore, by providing the isolation mounts 220 as disclosed, forged gear sets may be used and have the NVH levels (noise/vibration/harshness) of much more expensive gear sets.

Figure 11:
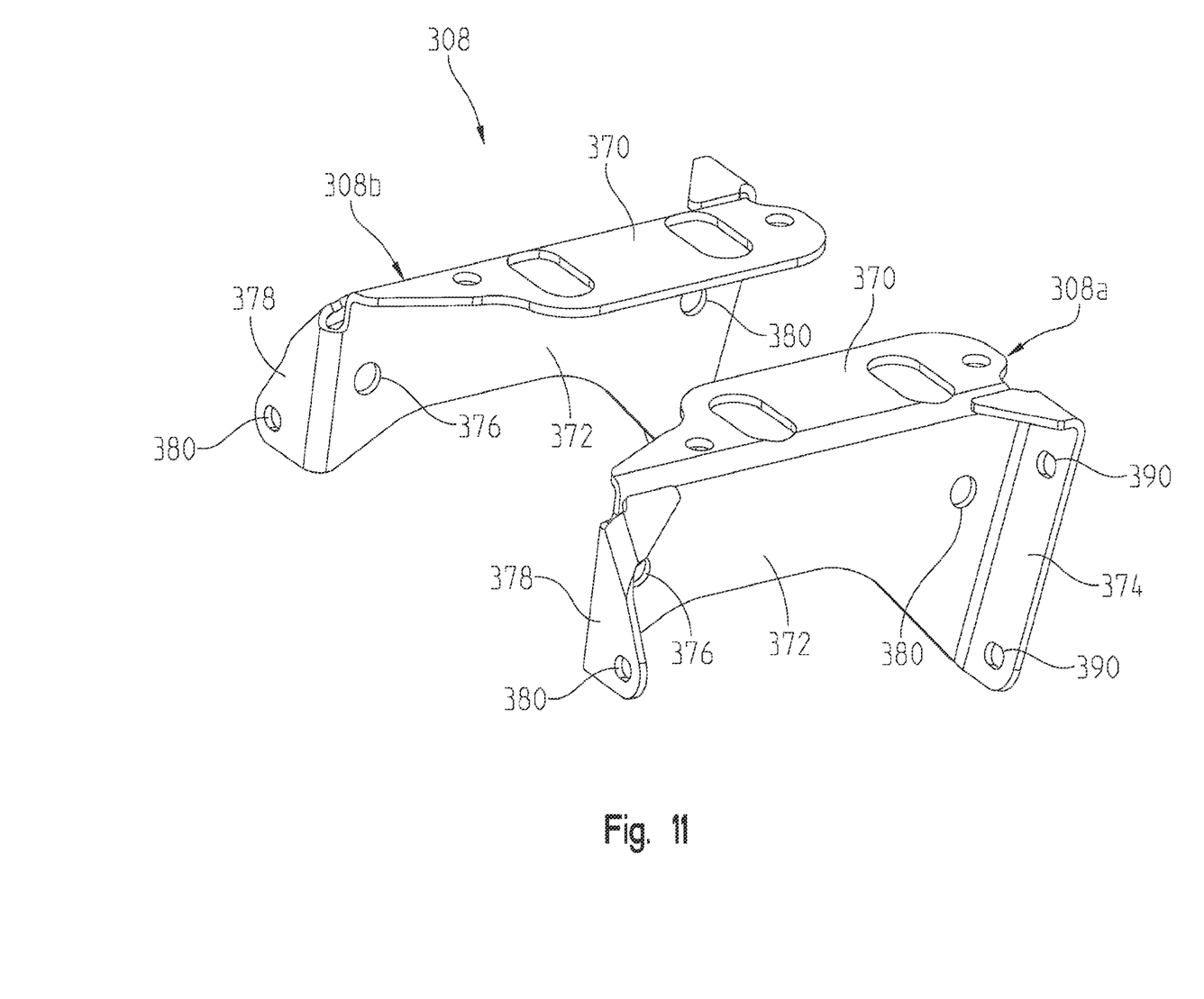
FIG. 11 is an alternate mount from that shown in FIG. 8.

As an alternative to the one-piece mount 8 shown in FIG. 4, mount 308 as shown in FIG. 11 has a two-piece construction including mount portions 308a and 308b. Each of the mount portions 308a, 308b has a top wall at 370, side walls at 372 and rear bracket walls at 374. Side walls 372 include mounting apertures 376 and 380 therethrough. The mount 308 has front flanges 378 with apertures 380 for fastening the mount 308 to the front frame portion 4. Mount 308 would otherwise operate in the same manner with fasteners 82 being receivable through apertures 376 and 380 to receive washers 84 and fasteners 86 as described herein. Rear bracket wall 374 would couple to the posts 100, 102 as previously described herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A powertrain mount assembly for a vehicle, the mount assembly comprising:
a frame including a plurality of three-sided channels each having a first side wall, a second side wall, and a third wall connecting the first side wall and the second side wall to form a U-shaped configuration having a space between the first side wall and the second side wall;
a powertrain component positioned between two of the plurality of three-sided channels, the powertrain component being a front drive having an input and an output, the input being adapted to be coupled to a prop shaft and the output adapted to drive at least one wheel of the vehicle,
the powertrain component being removably coupled to a first three-sided channel of the plurality of three sided channels with a removable fastener at a first vertical location, the removable fastener extending into the space of the first three-sided channel of the plurality of three-sided channels between the first side wall of the first three-sided channel of the plurality of three-sided channels and the second side wall of the first three-sided channel of the plurality of three-sided channels,
the plurality of three-sided channels including a first aperture to couple a first suspension arm at a second vertical location vertically offset from the first vertical location;
the plurality of three-sided channels including a second aperture to couple a second suspension arm at a third vertical location vertically offset from the first vertical location and from the second vertical location,
the first vertical location being laterally closer to a centerline of the vehicle than both the first second vertical location and the third vertical location.

2. The powertrain mount assembly of claim 1, wherein the first and second apertures are defined through the plurality of three-sided channels in a longitudinal direction of the vehicle.

3. The powertrain mount assembly of claim 1, wherein the first aperture is defined through the first side wall and second side wall of one of the plurality of three-sided channels.

4. The powertrain mount assembly of claim 1, wherein the second aperture is defined through the first side wall and second side wall of one of the plurality of three-sided channels.

5. The powertrain mount assembly of claim 1, wherein the removable fastener extends in a lateral direction of the vehicle.

6. The powertrain mount assembly of claim 1, wherein the removable fastener includes a bolt head that is positioned adjacent to and accessible from one of the first and second side walls of the plurality of three-sided channels.

7. The powertrain mount assembly of claim 1, wherein the plurality of three-sided channels include recesses configured to receive frame members.

8. The powertrain mount assembly of claim 1, wherein the powertrain component includes a differential.

9. The powertrain mount assembly of claim 1, wherein powertrain component includes a collar through which the removable fastener extends.

10. The powertrain mount assembly of claim 1, further comprising a front drive mount operable to couple to a vehicle frame.

11. The powertrain mount assembly of claim 10, wherein the front drive mount is operable to be coupled to the vehicle frame such that the powertrain mount assembly is positioned at least partially vertically between an upper frame member and a lower frame member of the vehicle frame.

12. The powertrain mount assembly of claim 1, wherein an opening is defined by the plurality of three-sided channels.

13. The powertrain mount assembly of claim 12, wherein the opening provides access to the powertrain component.

14. The powertrain mount assembly of claim 12, wherein one of the plurality of three-sided channels is coupled to a post.

15. The powertrain mount assembly of claim 14, wherein the post defines a boundary of the opening.

16. The powertrain mount assembly of claim 1, wherein the first suspension arm is coupled to a second three-sided channel of the plurality of three-sided channels, the second three-sided channel being spaced apart from the first three-sided channel.

* * * * *